March 31, 1942.   P. ANDERSON   2,277,942
WELDING APPARATUS
Filed March 18, 1940   3 Sheets-Sheet 1
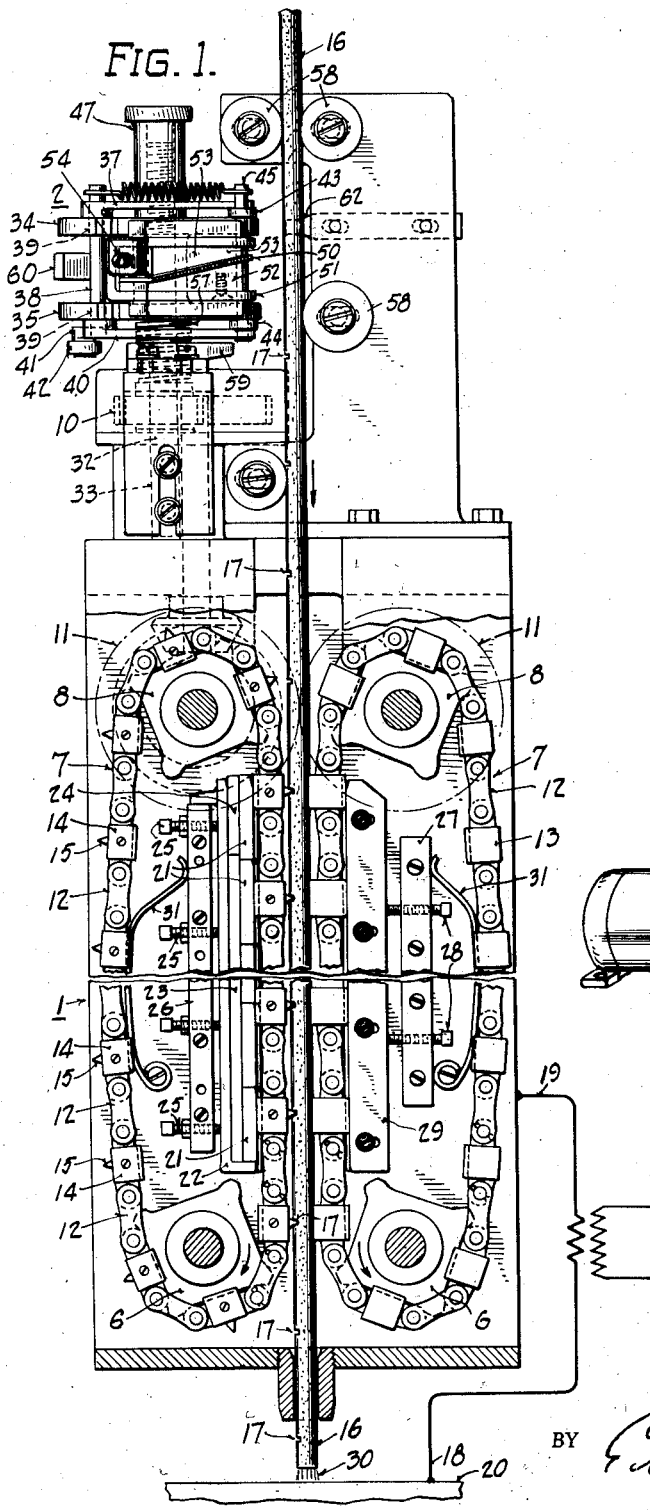
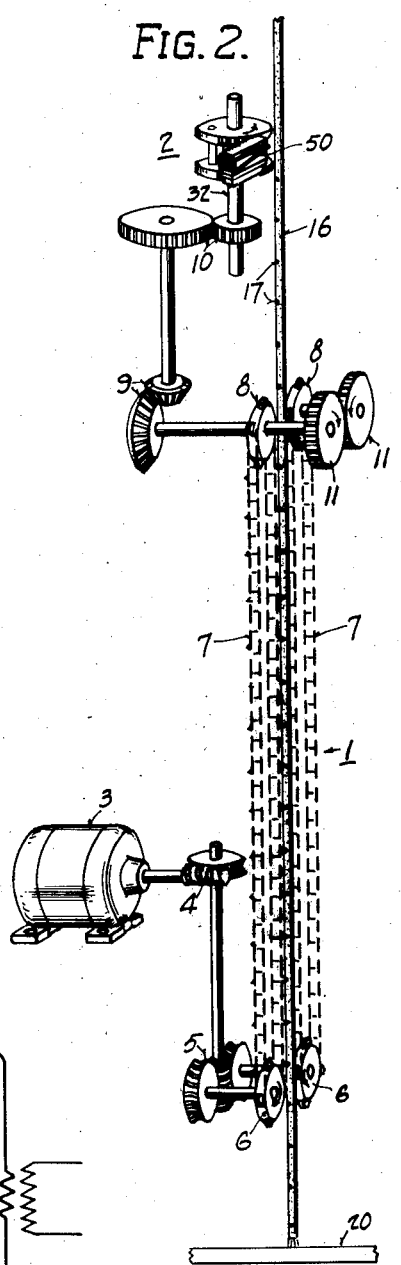
Perry Anderson
INVENTOR.
BY [signature]
ATTORNEY.

March 31, 1942.  P. ANDERSON  2,277,942
WELDING APPARATUS
Filed March 18, 1940   3 Sheets-Sheet 2
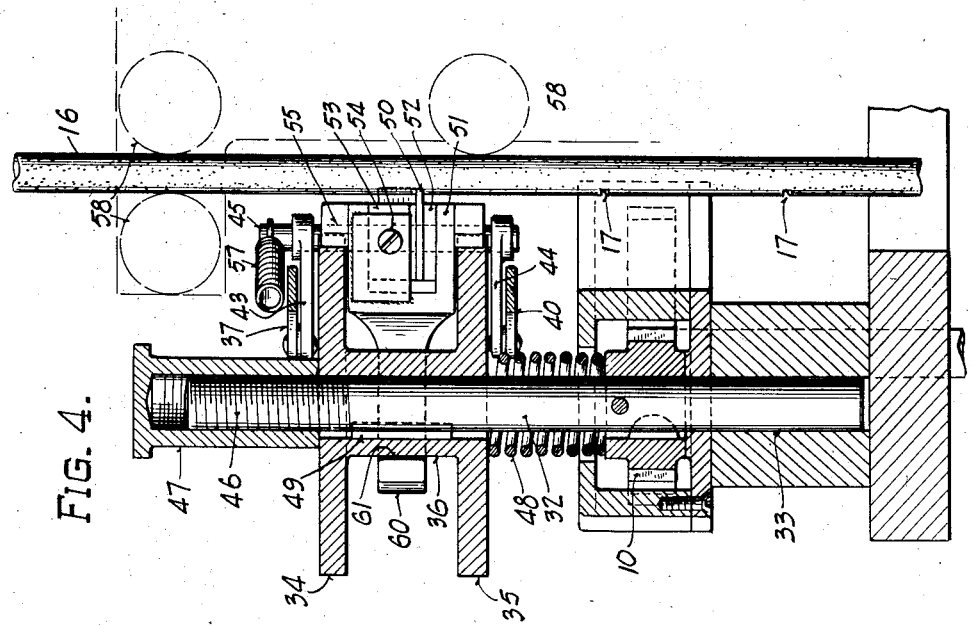
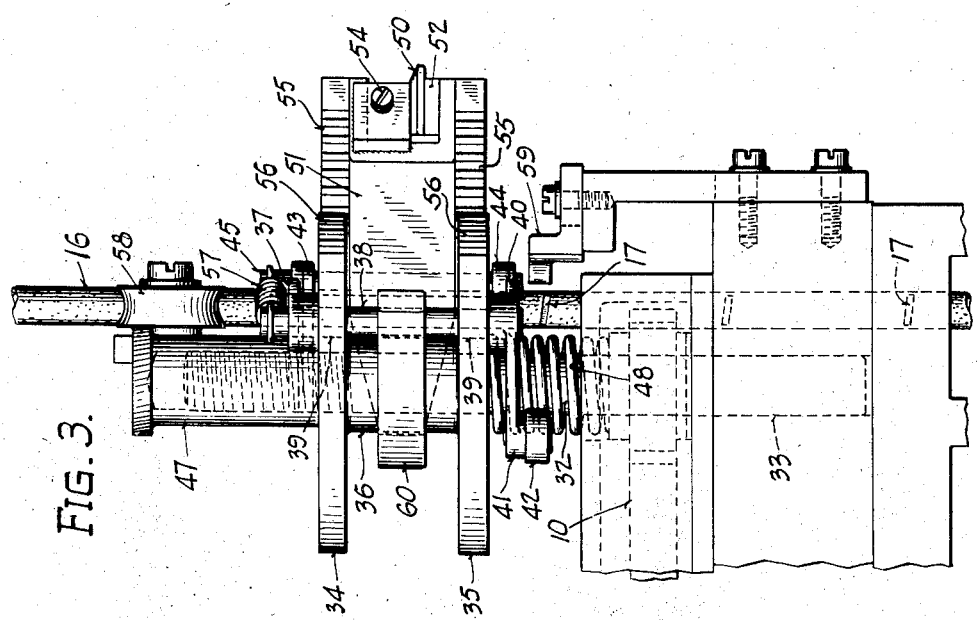
Perry Anderson
INVENTOR.
BY *[signature]*
ATTORNEY.

March 31, 1942.  P. ANDERSON  2,277,942
WELDING APPARATUS
Filed March 18, 1940  3 Sheets-Sheet 3

Perry Anderson
INVENTOR.

BY
ATTORNEY.

Patented Mar. 31, 1942

2,277,942

UNITED STATES PATENT OFFICE 2,277,942

WELDING APPARATUS

Perry Anderson, Wauwatosa, Wis., assignor to A. O. Smith Corporation, Milwaukee, Wis., a corporation of New York Application March 18, 1940, Serial No. 324,571

16 Claims. (Cl. 219—8)

This invention relates to apparatus for use in electric arc welding.

For certain applications of arc welding, it is desired to use long lengths of covered weldrod in conjunction with mechanism which not only feeds the weldrod to the work, but also cuts through the covering at intervals to produce bare contact spots on the conducting core of the weldrod. Through the bare spots, welding current is conducted by suitable contacts into the metal core of the weldrod close to the welding arc in order to avoid the electrical losses and excessive heating which would occur if the welding current were carried through a long length of weldrod. One of the difficulties encountered in the use of mechanism of this kind has been the rapid wear on the cutter caused by the hard and abrasive substances present in many weldrod coverings.

An object of this invention is to provide improved weldrod feeding mechanism of this character for use with long covered weldrods, either straight weldrods of considerable but limited length, or continuous weldrod wound on a reel.

Another object of the invention is to provide improved mechanism for cutting through the weldrod covering to provide bare spots through which the welding current is conducted into the metal core.

Another object of the invention is to provide improved cutting mechanism which uses simple and inexpensive cutters that can be readily replaced when worn by use on hard and abrasive coverings.

Other objects of the invention will be clear from the following detailed description and the accompanying drawings of an embodiment of the invention.

In the drawings:

Figure 1 is a view in elevation of the weldrod feeding mechanism and the mechanism for cutting through the covering;

Fig. 2 is a diagrammatic perspective view of the mechanism used to drive the weldrod feeding and cutting mechanisms in synchronism;

Fig. 3 is a view in elevation showing the cutting mechanism on a larger scale;

Fig. 4 is a sectional view taken on line 4—4 of Fig. 8; and

Figure 5:
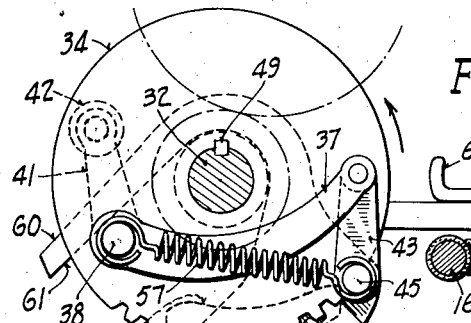

Figs. 5 to 8, inclusive, are top plan views of the weldrod cutting mechanism in different operating positions.

While any suitable weldrod feeding mechanism can be used in conjunction with the improved cutting means of this invention, a weldrod feeding mechanism with endless chains has been found very suitable and is here shown and described. Referring to the drawings, and in particular to Figs. 1 and 2, the weldrod feeding mechanism 1 and the cutting mechanism 2 are driven in synchronism by motor 3, worm gear 4, double worm gear 5, sprockets 6, endless chains 7, sprockets 8, bevel gear 9, and spur gear 10. Gears 11 are mounted on the shafts which carry sprockets 8 and mesh together to insure that the sprocket wheels 8 rotate in synchronism irrespective of any slight variations in the tightness of the endless chains 7.

In the embodiment shown, one of the endless chains is formed of links 12 uniting spacer blocks 13, and the other chain of links 12 uniting contact blocks 14. Each contact block 14 is provided with a projection 15 to contact the metal core of the weldrod 16 at the notches 17 previously cut through the covering by the cutting mechanism 2. Leads 18 and 19 from the source of welding current are connected, respectively, to the workpiece 20 and to the frame of the feeding mechanism. A contact made up of a number of sections 21 is grounded on the frame and is consequently in electrical connection with lead 19. The individual sections of the contact are carried on a contact support 22 from which they are spaced by a resilient rubber backing 23 and a rigid spacer 24. The contact support 22 is secured by screws 25 to an abutment 26 rigidly fastened to the frame of the machine. Abutment 27 and adjusting screws 28 hold a backing up strip 29 in position to force the blocks 13 into contact with the weldrod.

As the inner runs of the endless chains 7 move downward to feed the weldrod towards the work, the spacer blocks 13 and contact blocks 14 are carried between the contact sections 21 and the backing up strip 29 and force the projections 15 on the contact blocks into the notches 17 previously cut in the covering of weldrod 16. This establishes an electrical circuit from lead 19 through the frame of the machine and contacts 21, contact blocks 14, and weldrod 16 to the welding arc 30 and then through work piece 20 and lead 18 back to the source of welding current.

Because of the rigid support 24 behind the uppermost of the contact sections 21, the points 15 on contact blocks 14 are forced through any poorly conducting material which may remain in the notches 17 cut through the weldrod covering. The resilient rubber backing 23 then holds the other contact sections 21 and blocks 14 firmly against the weldrod but permits slight motion to accommodate irregularities in the dimensions of the rod or of the blocks 13 and 14. The contact sections 21, and backing up strip 29 can be moved closer together or farther apart by screws 25 and 28 in order to accommodate weldrods of different diameters. Leaf springs 31 are provided to bear against the outer runs of chains 7 and take up any slack.

The rate of feed of the weldrod to the work is controlled by regulating the speed of the motor 3, either manually or automatically by the use of control mechanism responsive to variations in welding arc characteristics.

The weldrod cutting mechanism indicated generally at 2, comprises a vertical shaft 32 supported in a bearing 33 and rotated in synchronism with the weldrod feeding mechanism by means which have been described. Two circular plates or discs 34 and 35 are rigidly fastened to sleeve 36 and rotate with it and with shaft 32. An arm 37 above the disc 34 is secured to the upper end of vertical shaft 38 journaled in bearings 39 in the discs 34 and 35, and another arm 40 below the dics 35 is secured to the lower end of shaft 38. The two arms 37 and 40 are disposed vertically one above the other and are of generally similar shape and size except that the upper arm 37 terminates at shaft 38, while the lower arm 40 has an extension 41 which projects beyond shaft 38 and carries a roller 42 at its end. Links 43 and 44, pivotally connected to arms 37 and 40, respectively, support a vertical pin 45 between the links.

The upper end of shaft 32 is provided with screw threads 46 which engage nut 47 for regulating the height of the cutting mechanism and consequently the position at which cuts will be made on the weldrod. A spring 48 holds the plate 34 in tight contact with the lower edge of nut 47 while spline drive 49 allows longitudinal motion of sleeve 36 along the shaft 32 but insures rotation of the sleeve with the shaft. By means of the nut 47 and spring 48 the cutting mechanism can be located at the appropriate height to cut notches in registry with the contact points 15 on blocks 14 of the endless chain.

The cutter used to cut through the weldrod covering is a piece of hack saw blade 50 mounted on cutter support 51 and is electrically insulated from it. The blade is held securely in position by being clamped between two insulating wedges 52 and 53, of which the first is rigidly secured to the cutter support 51 while the second is forced against the cutting blade by a set screw 54. Insulation is desirable to prevent any passage of current from the weldrod to the cutter with the attendant possibility of arcing and damage to the cutter teeth. When worn by continued use, the blade can be readily replaced by another. Since no cutter will work indefinitely against the hard and abrasive substances frequently present in weldrod coverings, it is an important economic advantage to employ a simple and cheap cutter like a hack saw blade rather than a specially formed cutter which would be far more expensive.

At its forward end, the cutter support 51 is pivoted on the pin 45 carried by the links 43 and 44. Racks 55 on the cutter support 51 mesh with pinion teeth 56 cut on a part of the peripheries of upper disc 34 and lower disc 35. A spring 57 is provided to pull the pin 45 towards the discs 34 and 35.

Figure 8:
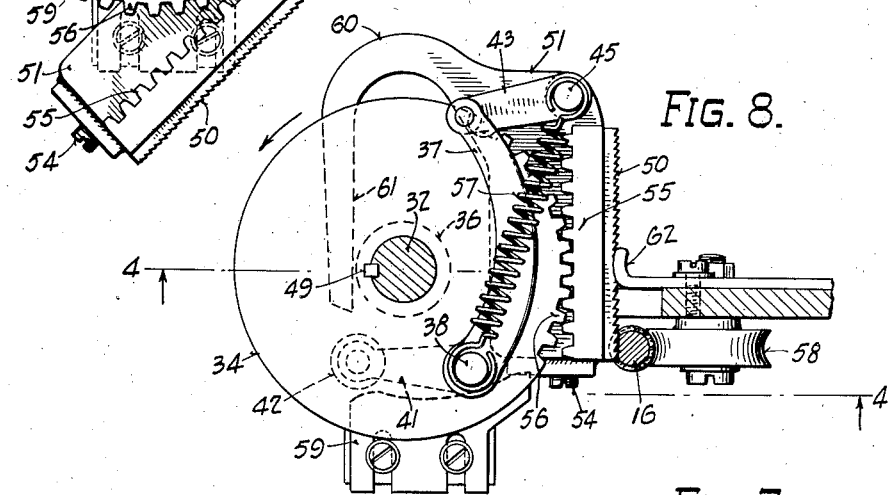
Figure 6:
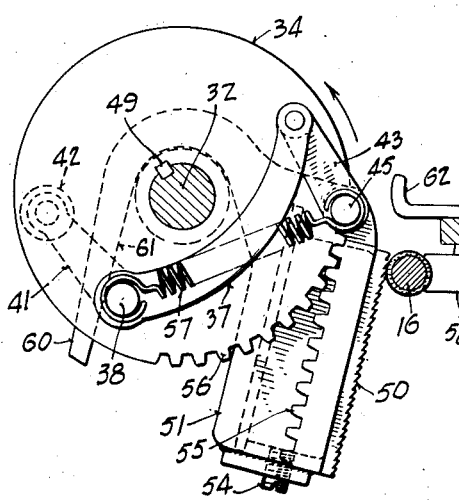
Figure 7:
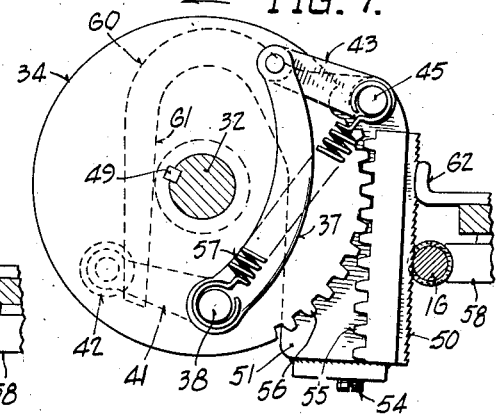

Referring to the drawings, when the cutting mechanism has the position shown in Fig. 5, the spring 57 holds the pin 45 in contact with the discs 34 and 35. The hack saw blade 50 is parallel to a tangent to disc 34 with its forward end nearer the center of the disc than its trailing end. Rotation of the discs 34 and 35 in the direction of the arrow brings the hack saw blade 50 into contact with the weldrod 16 and the cut begins as indicated in Fig. 6. Guide rollers 58 hold the weldrod against the cutting blade. As the cut progresses, the spring 57 presses the hack saw blade against the weldrod, while the cutter support 51 and the cutter blade are driven forward by rack 55 and pinion teeth 56. The position of the parts when the cut is half completed is shown in Fig. 7. In Fig. 8 the cut is almost completed.

The hack saw blade 50 is mounted on cutter support 51 with its forward end higher than its trailing end. The angle of inclination of the blade to the horizontal is so adjusted that the point of contact between the blade and the weldrod remains at a fixed position on the weldrod despite its downward motion brought about by the operation of the feeding mechanism. The angle of inclination will depend upon the relative speeds of rotation of the shaft 32 of the cutting mechanism 2 and sprockets 8 of the feeding mechanism 1, and can be readily found for any ratio of the gears connecting them. This gear ratio will be so chosen that a downward motion of the electrode equal to the distance between two projections 15 corresponds to one complete revolution of the cutting mechanism.

In this way the weldrod covering is cut through at notches separated a uniform distance equal to that between two successive contact points 15 on the blocks 14 of the travelling chain. Registry of the notches with the contact points can be effected by adjusting the height of the cutting mechanism by means of nut 47. The adjustment, when once made, is unaffected by the speed at which the weldrod is fed to the work since the feeding and cutting mechanisms are geared together and a variation in the speed of one will bring about a corresponding variation in the speed of the other.

In the absence of any further mechanism than that previously described, when the rotation of the discs 34 and 35 carries the trailing end of the hack saw blade past the weldrod, the spring 57 would suddenly snap the arms 37 and 40, links 43 and 44, and cutter support 51 back to the same relative positions in which they are shown in Fig. 5. Since a sudden return of this kind is undesirable, a stationary cam 59 is secured to the framework of the machine to bear against the roller 42 carried on extension 41 of the lower arm 40. The cam is so positioned that the roller contacts with it when the cut is just about completed, and forces the arm 40 to return gradually from the position shown in Fig. 8 to that shown in Fig. 5.

A yoke 60, partially encircling the sleeve 36, is rigidly secured to the cutter support 51 and is provided with a straight guiding surface 61, parallel to the rack 55. During the cut, the weldrod forces the cutter support 51 into contact with discs 34 and 35 and keeps the rack 55 engaged with the pinion teeth 56 cut on disc 34. After the cut is completed, however, the pressure exerted by the weldrod is removed, and the arms 37 and 40 are prevented by cam 59 and roller 42 from returning immediately to the positions which they occupy shortly before a cut begins.

In the absence of the yoke 60 and its guiding surface 61 which bears on sleeve 36, the pull exerted by the spring 57 might cause the rack 55 to become disengaged from the pinion teeth 56. Contact between the guiding surface 61 and the sleeve 36 keeps this from happening and holds the rack in engagement with the pinion.

As the rotation of the discs 34 and 35 carries the roller 42 along cam 59, the cam allows the roller to gradually move farther and farther from the center of the discs so that arms 40 and 37 and their associated mechanism are returned smoothly to the relative positions in which they are shown in Fig. 5.

A stop 62 may be provided to bear against the cutter support 51 and force the trailing end in when the device is operated without a weldrod present in the machine.

Since the trailing end of the cutter support and the hack saw blade are considerably farther from the center of the discs 34 and 35 than the forward end, the stop 62 may be desirable in certain installations to keep the trailing end of the saw from cutting into guide rollers or other parts of the machine which are cleared by the forward end. In other installations, the clearances may be such that even the trailing end of the blade would not contact them even if the cutter support is not forced in by a stop, and in such cases, the stop may be omitted.

The invention is claimed as follows:

1. In combination, a weldrod feeding apparatus, cutting means moved in synchronism with the weldrod feeding apparatus to pass a cutter transversely across a longitudinally moving weldrod, the path of movement of said cutter being disposed relatively to the path of movement of the weldrod to effect a transverse cutting through of the covering at one side of the weldrod for each cycle of operation of the cutter to provide successive accurately spaced openings in the covering for electrical contact purposes, and means to prevent relative longitudinal movement between the moving weldrod and its point of contact with the cutter.

2. In combination, a weldrod feeding apparatus, rotating means to pass a cutter mounted thereon transversely across a longitudinally moving weldrod and substantially prevent relative longitudinal movement between the moving weldrod and its point of contact with the cutter and cut notches through a coating on the weldrod at substantially uniform intervals, electrical contact points spaced apart a distance equal to an integral multiple of the distance between successive notches cut in the weldrod covering, and means to register the contact points with the notches cut through the covering of the electrode to supply current to a welding arc.

3. In combination with apparatus for feeding a covered weldrod longitudinally to a welding arc, rotating means to pass a cutter mounted thereon transversely across the longitudinally moving weldrod and substantially prevent relative longitudinal movement between the moving weldrod and its point of contact with the cutter, said cutter producing a notch in the covering of said weldrod for each revolution of said rotating means, electrical contact points disposed to contact with the core of the weldrod at points where it is laid bare by the cuts made through its covering, and means to register the contact points with the cuts and force them into contact with the metal core of the weldrod to establish electrical contact.

4. In combination with apparatus for feeding a covered weldrod longitudinally to a welding arc, a cutter disposed to move transversely across the weldrod to cut through the covering, and means to correlate the movement of the cutter with the longitudinal motion of the weldrod to substantially prevent any relative longitudinal movement between the weldrod and its point of contact with the cutter and to cut notches through the covering at substantially uniformly spaced intervals in the direction of the length of the weldrod, the path of movement of said cutter being disposed relatively to the path of movement of the weldrod to effect a transverse cutting through of the covering at one side of the weldrod for each cycle of operation of the cutter to provide successive accurately spaced notches for electrical contact purposes.

5. In combination with apparatus for feeding a covered weldrod longitudinally to a welding arc, a substantially straight cutter disposed to cut through the covering and expose the metal core of the weldrod, and means to move the cutter transversely across the weldrod and substantially prevent relative longitudinal motion between the moving weldrod and its point of contact with the cutter, the path of movement of said cutter being disposed relatively to the path of movement of the weldrod to effect a transverse cutting through of the covering at one side of the weldrod for each cycle of operation of the cutter to provide successive accurately spaced notches for electrical contact purposes.

6. In combination with a longitudinally moving covered weldrod, a substantially straight cutter disposed to cut through the covering and expose the metal core of the weldrod, means to move the cutter transversely across the weldrod and substantially prevent relative longitudinal motion between the moving weldrod and its point of contact with the cutter, and a spring to hold the cutter in contact with the weldrod throughout the cutting cycle.

7. In combination with apparatus for feeding a covered weldrod longitudinally to a welding arc, a substantially straight cutter disposed to cut through the covering and expose the metal core of the weldrod, means to move the cutter transversely across the weldrod and substantially prevent relative longitudinal motion between the moving weldrod and its point of contact with the cutter, a spring to hold the cutter in contact with the weldrod throughout the cutting cycle, and means to prevent sudden return of the parts actuated by the spring after the cutter has completed its cut and moved out of contact with the weldrod.

8. In combination with apparatus for feeding a covered weldrod longitudinally to a welding arc, a cutter support movable transversely across the weldrod, means to produce transverse motion of the support proportional to longitudinal motion of the weldrod, and a substantially straight cutter carried by the support and inclined at an angle to the weldrod, the angle being related to the longitudinal motion of the weldrod and the proportional transverse motion of the cutter to maintain the point of contact between the weldrod and the cutter at a substantially fixed position on the weldrod irrespective of its longitudinal motion.

9. In combination with apparatus for feeding a covered weldrod longitudinally to a welding arc, a cutter support movable transversely across the weldrod, means to produce transverse motion of the support proportional to longitudinal motion of the weldrod, a substantially straight cutter carried by the support and inclined at the appropriate angle to the weldrod to maintain the point of contact between the cutter and the weldrod at a substantially fixed position on the weldrod irrespective of its longitudinal motion, and resilient means to hold the cutter in contact with the weldrod.

10. In combination with apparatus for feeding a covered weldrod longitudially to a welding arc, a cutter support movable transversely across the weldrod, means to produce transverse motion of the support proportional to longitudinal motion of the weldrod, a substantially straight cutter carried by the support and inclined at the appropriate angle to the weldrod to maintain the point of contact between the cutter and the weldrod at a substantially fixed position on the weldrod irrespective of its longitudinal motion, spring operated means to hold the cutter in contact with the weldrod, and means operable after the cutter has left contact with the weldrod to gradually return the cutter to a position suitable for the beginning of the next cut across the weldrod.

11. In combination with apparatus for feeding a weldrod longitudinally to a welding arc, cutting means comprising a shaft parallel to the weldrod, means to rotate the shaft in proportion to the longitudinal movement of the weldrod, an arm free to rotate about a pivot rigidly connected to the shaft, a cutter blade support linked to the arm, a rack on the cutter blade support meshing with pinion teeth rigidly connected to the shaft, means to hold the rack and pinion teeth in engagement, a substantially straight cutter blade mounted on the cutter support and inclined at an angle to the shaft with the angle related to the proportional movements of the shaft and weldrod to substantially prevent any relative longitudinal movement between the weldrod and its point of contact with the cutter blade, and spring actuated means to press the cutter blade against the weldrod.

12. In combination with apparatus for feeding a weldrod longitudinally to a welding arc, cutting means comprising a shaft parallel to the weldrod, means to rotate the shaft in proportion to the longitudinal movement of the weldrod, an arm free to rotate about a pivot rigidly connected to the shaft, a cutter blade support linked to the arm, a rack on the cutter blade support meshing with pinion teeth rigidly connected to the shaft, means to hold the rack and pinion teeth in engagement, a substantially straight cutter blade mounted on the cutter support and inclined at an angle to the shaft with the angle related to the proportional movements of the shaft and weldrod to substantially prevent any relative longitudinal movement between the weldrod and its point of contact with the cutter blade, spring actuated means to press the cutter blade against the weldrod, and means operable after the cutter has left contact with the weldrod to gradually return the cutter to a position suitable for the beginning of the next cut across the weldrod.

13. In combination with apparatus for feeding a rod longitudinally, a straight saw toothed cutter, a rotary driving means for said cutter disposed adjacent the rod and rotating in synchronism with the forward movement of the rod to bring said cutter into contact with the rod at predetermined spaced intervals, and resilient means on said driving means for translating the rotary movement thereof into a substantially straight line movement of the cutter when the latter engages said rod.

14. In combination with apparatus for feeding a welding electrode longitudinally, a rotating member operating in synchronism with the movement of the electrode, a cutter blade mounted on said member to rotate therewith for periodically engaging and cutting said rod at predetermined spaced intervals, and means for electrically insulating said cutter from its supporting member to prevent the passage of current through the cutter blade.

15. In combination with apparatus for feeding a rod longitudinally, a rotating member disposed adjacent to the rod, a cutter blade mounted off center on said member for engaging and cutting the rod during each revolution of the member, means for synchronizing the rotation of the member with the forward movement of the rod to effect cutting of the rod at predetermined accurately spaced intervals, and means for preventing relative longitudinal movement between the rod and its point of contact with the blade during the cutting action of the latter.

16. In combination with apparatus for feeding a covered weldrod longitudinally to a welding arc, a cutter support movable in a plane substantially perpendicular to the direction of feed of the weldrod, a cutter mounted in the cutter support at an angle to the direction of motion of the support, resilient means to hold the cutter in contact with the weldrod, and means to synchronize the movement of the cutter support with the weldrod feed to maintain the point of contact between the cutter and the weldrod at a substantially fixed position on the weldrod irrespective of its longitudinal motion.

PERRY ANDERSON.